Feb. 6, 1973   R. H. LACKEY   3,714,751
WINDOW ASSEMBLY
Filed Aug. 20, 1971

INVENTOR.
Ronald H. Lackey
BY

W. A. Schutz
ATTORNEY

United States Patent Office 3,714,751
Patented Feb. 6, 1973

3,714,751
WINDOW ASSEMBLY
Ronald H. Lackey, Sterling Heights, Mich., assignor to General Motors Corporation, Detroit, Mich.
Filed Aug. 20, 1971, Ser. No. 173,363
Int. Cl. E06b 1/36, 3/62
U.S. Cl. 52—400
2 Claims

ABSTRACT OF THE DISCLOSURE

In a preferred form, this disclosure relates to a window assembly having a support structure within which a glass panel is maintained by a resilient retaining strip. The resilient retaining strip has a channel portion for slidably engaging the edge of the glass panel to form an oversize sub-assembly. The retaining strip also has a cam surface which is engaged by the support structure to cause the retaining strip to slide inwardly upon the glass panel as the sub-assembly is received within the support structure. The retaining strip further includes a deflectable locking flange means spaced from said channel portion and defining an elongated slot therebetween and which engages the support structure to maintain the assembly therein. The window assembly also includes a reveal molding means which has a flange portion for covering between the structural frame means and the edge of the glass panel. The locking flange also clamps a depending flange portion on the molding means against the channel portion of the resilient strip to hold the molding means in place.

---

Figure 1:
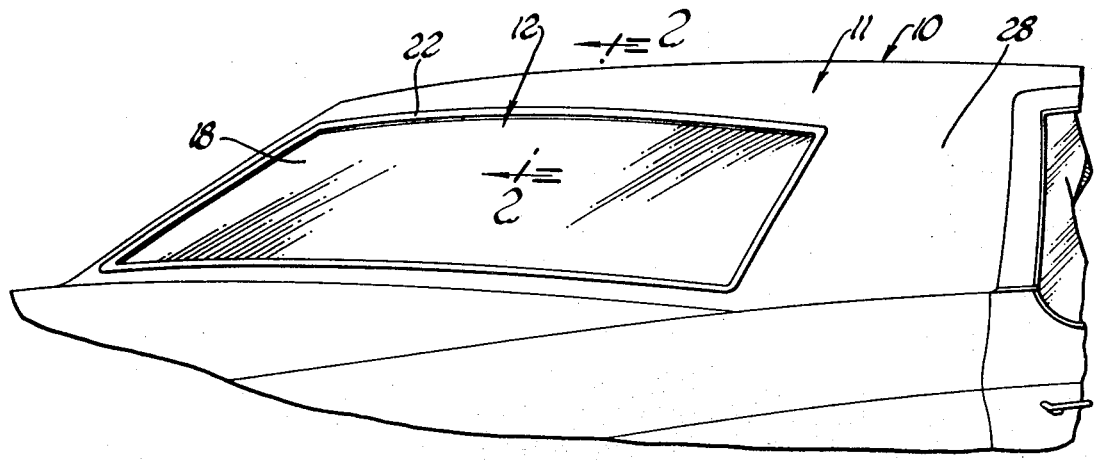

The present invention relates to a window assembly, and more particularly to a window assembly which has a resilient retaining strip.

Window assemblies for automotive vehicles have heretofore been provided wherein a glass panel with weather stripping about its periphery is maintained within a window receiving opening in an automotive vehicle body by a plurality of studs which are mechanically fastened to the vehicle body structure defining the periphery of the opening. Conventionally, the glass panel assembly is positioned within the body opening and against the body structure and then studs are positioned in an overlapping relationship upon both the peripheries of the vehicle body structure defining the window opening and the glass panel assembly and firmly fastened to the vehicle body. Further, the studs or clips generally serve the purpose of retaining a chrome or reveal molding for decorative purposes through some type of a sliding and interlocking relationship.

An object of the present invention is to provide a new and improved window assembly which comprises a support structure which has a side wall portion defining a receiving opening and a bottom wall portion, a glass panel, a resilient retaining strip having a channel portion for slidably receiving and engaging the edge of the glass panel to form a sub-assembly with the glass panel which is larger than the receiving opening and which has a cam surface thereon which is engaged by the support structure means to cause the retaining strip to slide inwardly upon the glass panel when the assembly is forced into the receiving opening and toward the bottom wall portion to position the sub-assembly within the receiving opening, and in which the retaining strip has a locking flange means spaced from said channel portion and defining with said channel portion an elongated slot therebetween, and in which the locking flange means engages the side wall portion to maintain the assembly within the receiving opening, and a molding for covering the retaining strip and having a depending flange which is received within the slot and held in clamped engagement against the channel portion by the locking flange.

Accordingly, the above and other objects of the present invention are accomplished, in the preferred embodiment, by providing a support structure, a glass panel, a resilient retaining strip, and a reveal molding. The support structure has a side wall portion projecting perpendicularly inward from the outer body of the automotive vehicle and defining a receiving opening and a bottom wall portion extending perpendicularly from said side wall portion into the receiving opening. The retaining strip has a channel portion for slidably receiving and engaging the edge of the glass panel to form a sub-assembly with the glass panel which is larger than the receiving opening. The retaining strip also includes a cam surface which is engaged by the support structure for sliding the retaining strip inwardly upon the glass panel when the assembly is forced into the receiving opening and thereafter against the bottom portion of the support structure whereby the assembly is received within the receiving opening. Further, the retaining strip has a locking flange spaced from said channel portion and projecting from immediately adjacent the cam surface to define with the channel portion an elongated slot. The locking flange is deflected inwardly by the side portion of the support structure as the sub-assembly is received within the receiving opening and thereafter engages the side wall portion of the support structure to maintain the assembly within the receiving opening. The reveal molding has a depending flange which is inserted and retained between the deflected locking flange and the channel portion and a reversely bent outer portion which extends between the side wall portion of the support structure and the glass panel to cover the retaining strip.

Figure 2:
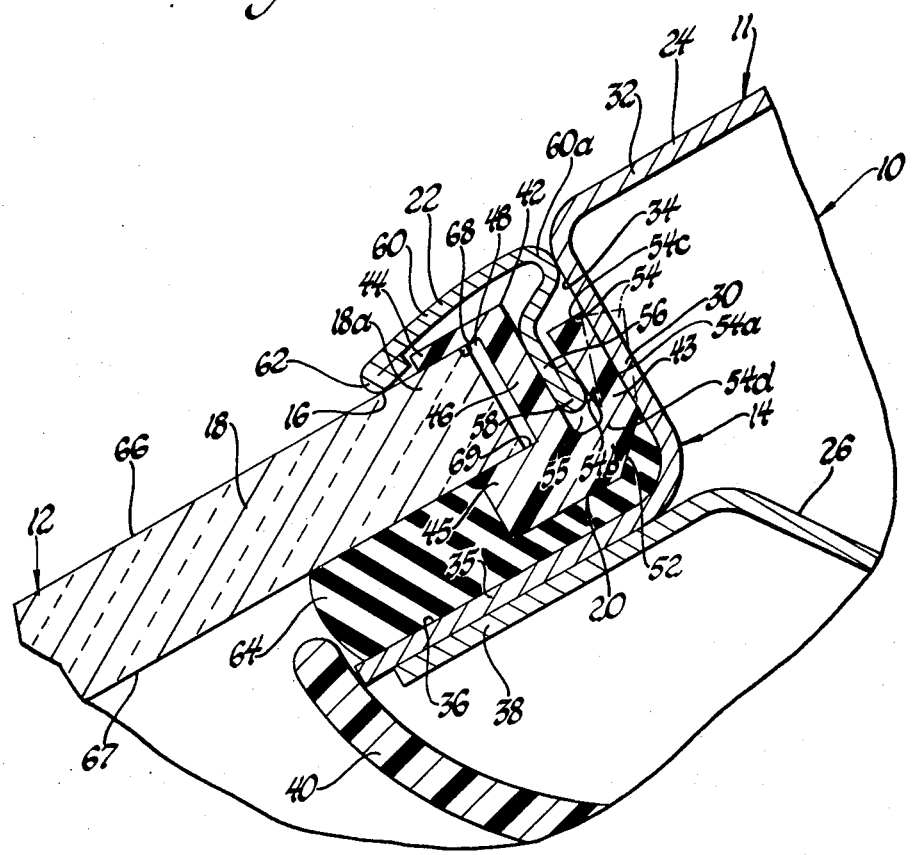

These and other objects of the invention will become more fully apparent from the following description and drawing wherein:

FIG. 1 is a fragmentary rear perspective view of an automotive vehicle embodying the novel window assembly of the present invention; and FIG. 2 is an enlarged cross section view taken approximately along line 2—2 of FIG. 1.

As representing a preferred embodiment of the present invention, the drawings show an automotive vehicle body 10 having a roof panel assembly 11 and a rear window assembly 12. The roof panel assembly 11 is shown as formed from outer and inner roof panels 24 and 26, respectively, which are welded or otherwise suitably attached. Although the window assembly 12 of the present invention could be used in various applications, it is particularly well adapted for use as a stationary or curtain window in an automotive vehicle body.

The window assembly 12 broadly comprises a support structure 14 which defines a window receiving opening 16, a glass panel or window 18, a retaining strip 20 which slidably engages the outer peripheral edge 18a of the glass panel 18 and which frictionally engages the support structure 14 to maintain the glass panel 18 within the receiving opening 16, and a reveal molding 22 which is retained by the retaining strip 20 and extends between the support structure 14 and the glass panel 18.

Referring to FIGS. 1 and 2, the roof panel assembly 11 of the vehicle body 10 constitutes the support structure 14 of the present invention. The rearward portion of the roof panel assembly 11 in the area behind and between the sail panels 28 is shown as defining a generally rectangularly shaped receiving opening 16 in the vehicle body 10. The receiving opening 16 is defined by the outer roof panel 24 which has a first or side wall portion 30 bent radially inwardly and in a perpendicular relationship with an outer exterior portion 32 of the outer roof panel 24. The first portion 30 of the outer roof panel component 24 provides a first surface 34 which defines the generally rectangularly shaped receiving opening 16 in the vehicle body 10. The first portion 30 extends a suitable distance inwardly from the outer portion 32 of the outer roof panel 24 to allow for the reception of the sub-assembly comprising the glass panel 18 and the retaining strip 20, as will later be described. The outer roof panel 24 further includes a second or bottom portion 35 which is formed in a perpendicular relationship from the inner end of the first portion 30 and which projects into the receiving opening 16 defined by the first surface 34. The second portion 35 provides a stop or seat for the sub-assembly comprising the glass panel 18 and the retaining strip 20 and provides a second surface 36 for purposes to be later described. The inner roof panel 26 is formed with a flange portion 38 which lies flush with the inner side of the second portion 35 of the outer roof panel 24. Further, the juncture of the second portion 35 of the outer roof panel 24 and the flange portion 38 of the inner roof panel 36 is covered for aesthetic purposes with a suitable plastic garnish molding 40.

It should be understood that the glass panel 18 is of a generally complementary shape and slightly undersized with respect to the receiving opening 16 defined by the first surface 34 of the outer roof panel 24.

The retaining strip 20 can be made from any suitable resilient material, such as plastic, and comprises a U-shaped or channel portion 42 for retaining the glass panel 18 and a locking portion 43 for retaining the assembly on the support structure 14. The channel portion 42 has an outer side wall 44, an inner side wall 45, and a back or bottom side 46. The walls 44–46 define a channel or slot 48 which frictionally or snugly receives the outer peripheral edge portion 18a of the glass panel 18.

The locking portion 43 of the retaining strip 20 comprises a locking flange 54 coextensive with, but spaced from the bottom wall 46 of the channel portion 42. The flange 54 is integral with the channel portion 42 at its lower end, as viewed in FIG. 2, and defines with the bottom wall 46 of the channel portion 42 an elongated slot 55. The locking flange 54 has an outer side surface 54a and an inner side surface 54b which faces the bottom wall 46 of the channel portion 42. Further, the locking flange 54 is linearly tapered such that its thickness progressively decreases proceeding from its free end portion 54c toward its lower end portion 54d. The locking flange 54 is self-biased toward the position shown by the dotted lines in FIG. 2 when in its free state. The retaining strip 20 has a beveled cam surface 52 adjacent its lower right corner, as viewed in FIG. 2. The retaining strip 20 can be of any suitable length which would provide for a plurality of strips to be positioned about the periphery of the glass panel 18, as will later be explained.

The reveal molding 22 is of any suitable or conventional material, such as steel, and has its outer surface chrome plated for aesthetic purposes. The molding 22 has a depending flange portion 56 which terminates in a reversely bent end portion 58 and is received within the slot 55. The molding 22 also includes an outer portion 60 overlying the strip 20 and having a reversely bent section 60a integral with the flange portion 56 and a free end section 62 which is also reversely bent.

A suitable sealant-adhesive 64 is positioned between the assembly comprising the glass panel 18 with the retaining strips 20 and the first and second surfaces 34 and 36 of the roof panel 24 to provide the window assembly 12 with a seal.

In assembly, a suitable adhesive which will not permanently harden or set up is applied around the peripheral edge portion of the glass panel 18 on both its outer and inner sides 66 and 67 or to the side walls 68 and 69 of the groove 48 in the retaining strips 20. A plurality of the retaining strips 20 are then positioned about the periphery of the glass panel 18 with the edges of the glass panel 18 being received within the channel 48 with a force fit.

The retaining strips 20 are positioned upon the edge portions of the glass panel 18 in a manner such that the resulting sub-assembly is larger than the maximum size the receiving opening 16 can assume while being within its pre-established tolerances.

The sealant-adhesive 64 is next installed with a manually or machine guided dispenser or gun to the first and second surfaces 34 and 36 of the roof panel 24. The assembly comprising the glass panel 18 and the retaining strips 20 is then positioned about the receiving opening 16 and with the beveled cam surfaces 52 of the retaining strips 20 engaging the juncture between the outer portion 32 and the first portion 30 of the roof panel 24. It should be noted that the width of the cam surfaces 52 and the positioning of the retaining strips 20 upon the edge of the glass panel 18 are such that the cam surfaces 52 will always engage the juncture between portions 32 and 30 so long as the size of the receiving opening 16 remains within its pre-established tolerances. Upon pressing the assembly 12 within the receiving opening 16, the engagement between the juncture of portions 30 and 32 and the cam surfaces 52 results in the retaining strips 20 being cammed and forced to slide inwardly upon the glass panel 18. It should be noted that the depth of the channel or slot 48 is sufficient such that the edge of the glass panel 18 will not bottom out or engage the bottom wall 46 of the channel portion 42 as long as the receiving opening 16 is not below its minimum allowable size. It follows that the overall size of the assembly comprising the glass panel 18 and the retaining strips 20 is decreased as the retaining strips 20 are cammed inwardly upon the glass panel 18 and the assembly is gradually received within the receiving opening 16. The retaining strips 20 are no longer forced inwardly upon the edges of the glass panel 18 when the cam surfaces 52 pass the juncture between the outer portion 32 and the first portion 30 of the roof panel 24.

After the cam surfaces 52 clear the juncture of the two portions 30 and 32, the locking flanges 54 of the retaining strips 20 are engaged by the portion 30 which serves to deflect the locking flange 54 of each retaining strip 20 inwardly from its dotted line position toward the periphery of the glass panel 18, as shown by the solid lines in FIG. 2. As the assembly is received within the receiving opening 16 the locking flange 54 is caused to engage the first surface 34 of the portion along its entire length, and its outer surface 54a is moved to a substantially parallel position with respect to the bottom side 46 of the retaining strip 20. The deflection of the locking flange 54 to the solid line position of FIG. 2 causes the width of the slot 55 adjacent its upper end to decrease to a dimension which is less than the width of the end 58 of the rearwardly extending flange 56 of the molding 22.

The rearwardly extending flange 56 of the molding 22 is thereafter positioned above the above-identified slot 55 and, upon a sufficient application of force, the end 58 of the depending flange 56 is caused to pass into the slot 55 as a result of the resiliency and deformability of the plastic retaining strip 20. The downwardly extending flange 56 is inserted into the slot 55 until the reversely bent section 60a of the molding 22 engages the first surface 34 of the structural member 14 and the end 62 of the molding 22 contacts the glass panel 18. The outer portion 60 of the molding 22 then extends from the first surface 34 of the structural member 14, completely over the retaining strips 20 to the glass panel 18 and in this manner completely conceals the retaining strips 20. The end 58 of the rearwardly extending flange 56 is thereafter retained in clamped engagement between the bottom wall 46 of the channel portion 42 and the inner side 54b of the locking flange 54.

From the above, it should be apparent that the locking flange 54 serves as a wedge to both securely retain both the glass panel 18 and the reveal molding 22 within the receiving opening 16 of the support structure 14. If desired, a suitable adhesive could be applied to the bottom of the seat 52 in the weather strip 64 to further secure the retaining strip 20 in place.

The primary advantages of the present invention are that it substantially eliminates the necessity of using clips and studs which must be mechanically fastened to the vehicle body for securing window assemblies and moldings to the vehicle body and it provides for protection of the glass panels in transit to the assembly plant in that the retaining strips can be applied prior to shipment to thereby protect the edges of the glass panels during transit.

The foregoing disclosure relates to only one embodiment of the invention which may be modified within the scope of the appended claims.

What is claimed is:

1. A window assembly, comprising: a support structure having a side wall portion defining a receiving opening and a bottom wall portion; a glass panel; a resilient retaining strip having a channel portion which slidably receives and engages the edge of said glass panel to form a sub-assembly with said glass panel which is larger than said receiving opening, said retaining strip having a cam surface which engages said support structure to cause said retaining strip to slide inwardly upon said glass panel when said glass panel and retaining strip are forced into said receiving opening toward said bottom portion to position said sub-assembly within said receiving opening, said retaining strip having a deflectable locking flange means spaced from said channel portion and with the channel portion defining an elongated slot therebetween, said flange means engaging said side wall portion of said support structure and being deflected toward said channel portion to maintain said sub-assembly within said receiving opening; a molding means for covering said retaining means and having a depending flange which is received in said slot and held in clamped engagement against said channel portion by said locking flange.

2. A rear window assembly for an automotive vehicle, comprising: a support structure having a side wall portion projecting perpendicularly inward from the outer body of the automotive vehicle and defining a receiving opening and a bottom wall portion extending perpendicularly from said side wall portion into said opening; a glass panel; a resilient retaining strip having a channel portion for slidably receiving and engaging the edge of said glass panel to form a sub-assembly with said glass panel which is larger than said receiving opening, said retaining strip having a cam surface facing outwardly from said sub-assembly which engages said support structure at the juncture between said side wall portion and said outer body to cause said retaining strip to slide inwardly upon said glass panel when said sub-assembly is forced into said receiving opening toward said bottom wall portion to position said assembly within said receiving opening, said retaining strip having a deflectible locking flange projecting at an acute angle from said channel portion and immediately adjacent said cam surface to define an elongated slot therebetween, said locking flange being deflected toward said channel portion by the juncture between said side wall portion and said outer body after said cam surface passes said juncture, said locking flange thereafter engaging said side wall portion to maintain said sub-assembly within said receiving opening; a molding having a depending flange which is inserted within said slot and retained in clamped engagement against said channel portion by said locking flange, said molding having a reversely bent outer portion engaging said side wall portion and said glass panel to cover said retaining strip; and sealing means between said glass panel and said support structure to form a seal.

References Cited
UNITED STATES PATENTS

| | | | |
|---|---|---|---|
| 2,233,335 | 2/1941 | Axe et al. | 52—400 |
| 2,772,915 | 12/1956 | Renno | 52—400 X |

FRANK L. ABBOTT, Primary Examiner

J. R. MASTERMAN, Assistant Examiner

U.S. Cl. X.R.

52—208, 400, 403